(12) United States Patent
Komoto

(10) Patent No.: US 7,020,851 B2
(45) Date of Patent: Mar. 28, 2006

(54) UNIVERSAL SERIAL BUS CIRCUIT AND DATA STRUCTURE

(75) Inventor: Eiji Komoto, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 508 days.

(21) Appl. No.: 10/281,248

(22) Filed: Oct. 28, 2002

(65) Prior Publication Data

US 2003/0200475 A1   Oct. 23, 2003

(30) Foreign Application Priority Data

Apr. 19, 2002   (JP) .............................. 2002-118314

(51) Int. Cl.
  *G06F 17/50* (2006.01)

(52) U.S. Cl. ............................................. 716/1; 716/6

(58) Field of Classification Search ................... 716/1, 716/6; 710/106, 313
See application file for complete search history.

(56) References Cited

U.S. PATENT DOCUMENTS 6,757,763 B1 * 6/2004 Preiss et al. ................. 710/106
6,816,994 B1 * 11/2004 Schoenfeld et al. ........... 716/1

FOREIGN PATENT DOCUMENTS

| JP | 09-139731 | 5/1997 |
|---|---|---|
| JP | 10-56362 | 2/1998 |
| JP | 10-301899 | 11/1998 |
| JP | 2000-183920 | 6/2000 |
| JP | 2000-307561 | 11/2000 |

* cited by examiner

*Primary Examiner*—Paul Dinh
(74) *Attorney, Agent, or Firm*—Rabin & Berdo, PC

(57) ABSTRACT

A USB circuit that can prevent phase difference between a signal pair with high precision without the need for strict design conditions. In a preferred embodiment of this USB circuit, the USB controller thereof comprises a flip-flop pair to match the timings of a signal pair output to an output signal line pair and a flip-flop pair to match the timings of a signal pair input from an input signal line pair, and the USB driver thereof comprises a third flip-flop pair to match the timings of a signal pair input from the output signal line pair, and a fourth flip-flop pair to match the timings of a signal pair output to the input signal line pair.

3 Claims, 9 Drawing Sheets

UNIVERSAL SERIAL BUS CIRCUIT AND DATA STRUCTURE

BACKGROUND OF THE INVENTION

1. Field of the Invention

The present invention is related to a USB circuit provided in a semiconductor integrated circuit.

2. Description of Related Art

Conventionally, USB (Universal Serial Bus) is known as a standard for connecting a host such as a personal computer and peripheral equipment such as printers, scanners, modems and the like. USB is a standard that is designed for unifying the connection interfaces of the various peripheral equipment. Consequently, employment of the USB standard makes possible to use a single type interface regardless of the type of peripheral equipment.

A USB circuit includes a USB controller and a USB driver. The USB controller and USB driver are separately mounted on the same semiconductor chip. The USB controller and USB driver are connected using an input signal line pair and an output signal line pair. The USB driver is also connected by different pairs of signal lines to the USB connector being provided with the case of the equipment.

A USB signal comprises a pair of signals D+ and D−. In the USB standard, the value of the signals D+ and D− must always change at the same phase. As a result, the propagation delay for both of the input signal line pair, as well as for both of the pair of output signals lines, must be equal. If a phase difference occurs with respect to a change in the signals D+ and D−, errors may occur in the operation of the host or peripheral device using the USB interface.

For matching the propagation delay for each pair of signal lines, the layout of the semiconductor integrated circuit must be designed to ensure that the lengths of the two signal lines are identical. Moreover, the number of gates in the USB driver must be made identical. However, it is not easy to make the lengths of the signal lines perfectly equal, which significantly increases the difficulty of designing. Furthermore, even where the design succeeds in making the lengths of the pair of signal lines perfectly equal, during actual operation of the semiconductor integrated circuit phase difference sometimes occurs between the signals D+ and D− due to a change in the external operating conditions, such as a fluctuation in the power supply voltage or the ambient temperature.

In recent years, it has become popular to manage semiconductor integrated circuits as IP (Intellectual Property) blocks. An IP block is a circuit block that is bought and sold commercially as intellectual property. For example, when an high degree of system LSI (Large-Scale Integrated Circuit) or the like is to be made into a commercial product, it is not easy for a single semiconductor manufacturer to develop all of the circuit blocks on the LSI. On the other hand, where IP blocks are marketed between corporations, the cost of development can be reduced and the lead time for development can be shortened.

In order to increase the commercial value of an IP block, it is required to minimize the design modification of the IP block according to kinds of integrated circuit chip on which the IP block is mounted, as well as minimize influences on the designs of other circuit blocks. However, because the conventional USB circuit must be designed such that the lengths of the signal lines match perfectly, it occurs frequently that design of the USB circuit block becomes to need to be modified substantially and designs of other blocks become to need to be modified under influence of the USB circuit.

SUMMARY OF THE INVENTION

An object of the present invention is to provide a USB circuit that can prevent occurrence of phase difference of signal pairs accurately without being required strict design condition.

(1) The USB circuit according to a first invention comprises: a USB controller formed on a semiconductor chip; a USB driver formed on the semiconductor chip; an output signal line pair and an input signal line pair formed on the semiconductor chip for connecting the USB controller and the USB driver; a first flip-flop pair provided in the USB controller for matching the timing of the signal pair output to said output signal line pair; a second flip-flop pair provided in the USB controller for matching the timing of the signal pair input from the input signal line pair; a third flip-flop pair provided in the USB driver for matching the timing of the signal pair input from the output signal line pair; and a fourth flip-flop pair provided in the USB driver for matching the timing of the signals output to the input signal line pair.

Using this construction, because the input and output timings of both pairs of signals can be matched at both ends of the output signal line pair and the input signal line pair, phase difference of the signal pairs can be prevented accurately without being required strict design condition.

(2) The USB circuit according to a second invention comprises: a USB controller formed on a semiconductor chip; a USB driver formed on the semiconductor chip; an output signal line pair and an input signal line pair formed on the semiconductor chip for connecting the USB controller and the USB driver; a first flip-flop pair provided in the USB controller for matching the timing of the signal pair output to the output signal line pair; a second flip-flop pair provided in the USB controller for matching the timing of the signal pair input from the input signal line pair; a first delay adjustment circuit that adjusts the signal propagation delay time for at least one of the output signal line pair in accordance with the value of a delay control signal; and a second delay adjustment circuit that adjusts the signal propagation delay time for at least one of the input signal line pair in accordance with the value of a delay control signal.

Using this construction, because the input timings or output timings of the signal pairs can be matched using one end of the output signal line pair and one end of the input signal line pair and the signal propagation delay times of these pairs can be matched, phase differences of the signals can be prevented accurately without being required strict design condition.

(3) The data structure according to a third invention indicates a information in accordance with one or more pre-designed circuit blocks, wherein: the information is used in an apparatus which designs a semiconductor integrated circuit by performing layout and wiring of the pre-designed circuit blocks: and USB driver is constructed by one block which contains a first flip-flop pair to match the timings of the signal pair input from the output signal line pair, a second flip-flop pair to match the timings of the signal pair output to the input signal line pair, a first driver pair that output to the outside the signal pair output from said first flip-flop pair, and a second driver pair that output to said second flip-flop pair the signal pair input from the outside.

The use of a data structure having the above construction makes it easy to design an integrated circuit by making it unnecessary, each time an integrated circuit is designed, to design the first and second pairs of flip-flops and the first and second drivers, as well as to design the wiring between these elements.

BRIEF DESCRIPTION OF THE DRAWINGS

Other objects and advantages of the present invention will be described with reference to the accompanying drawings described below.

DESCRIPTION OF THE PREFERRED EMBODIMENTS

Figure 1:
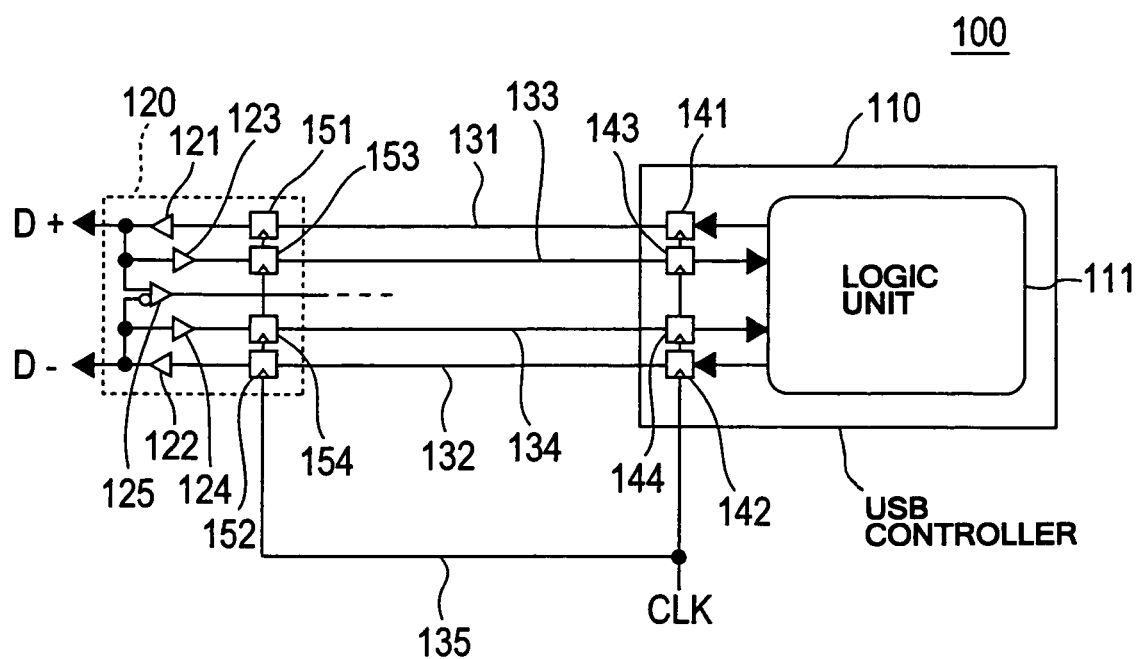
FIG. 1 is a circuit diagram showing in a simplified fashion the principal structure of a USB circuit according to a first embodiment.

Embodiments of the present invention will be described below with reference to the drawings. In the drawings, the size, configuration and relative placement of each constituent element is shown in a simplified fashion only to enable the present invention to be understood, and the numerical conditions described below are mere examples.

First Embodiment

The USB circuit pertaining to a first embodiment of the present invention will be explained below with reference to FIG. 1.

FIG. 1 is a block diagram showing in a simplified fashion the principal structure of a USB circuit according to this embodiment.

As shown in FIG. 1, the USB circuit 100 according to this embodiment includes a USB controller 110, a USB driver 120, a first pair of signal lines 131 and 132, a second pair of signal lines 133 and 134, and a clock line 135. These constituent elements 110, 120 and 131–135 are formed on the same Integrated circuit chip.

The USB controller 110 includes a logic unit 111, a first flip-flop pair 141 and 142, and a second flip-flop pair 143 and 144.

The logic unit 111 generates USB signals D+, D− and outputs them to the flip-flop pair 141 and 142, and carries out prescribed processing using the USB signals D+, D− input from the flip-flop pair 143 and 144. The processing carried out by the logic unit 111 is identical to the processing carried out by the conventional USB circuit, and will therefore not be explained here.

As the first flip-flop pair 141 and 142, the flip-flop 141 latches the signal D+ input from the logic unit 111 at the rising edge of the clock CLK and outputs it to the signal line 131, while the flip-flop 142 latches the signal D− input from the logic unit 111 at the rising edge of the clock CLK and outputs it to the signal line 132. Here, the clock line 135 is placed such that the difference in the delay periods of the clock CLK provided to the flip-flop pair 141 and 142 is effectively zero.

As the second flip-flop pair 143 and 144, the flip-flop 143 latches the signal D+ input from the signal line 133 at the rising edge of the clock CLK and outputs it to the logic unit 111, while the flip-flop 144 latches the signal D− input from the signal line 134 at the rising edge of the clock CLK and outputs it to the logic unit 111. Here, the clock line 135 is placed such that the difference in the delay periods of the clock CLK provided to the flip-flop pair 143 and 144 is effectively zero.

The USB driver 120 includes a driver circuit comprising buffers 121–124, a logic element 125, a third flip-flop pair 151 and 152, and a fourth flip-flop pair 153 and 154.

The output terminal of the buffer 121 and the input terminal of the buffer 123 are connected to the D+ terminal of the USB connector (not shown in the drawing). The output terminal of the buffer 122 and the input terminal of the buffer 124 are connected to the D− terminal of the USB connector (also not shown). Here, the wiring from the buffers 121 and 123 to the D+ terminal and the wiring from the buffers 122 and 124 to the D− terminal are designed such that the propagation delay times are identical for both. The USB connector is provided to the case of the equipment in which the Integrated circuit chip is installed.

The logic element 125 is connected to the D+ terminal of the USB connector at the positive input terminal and is connected to the D− terminal of the USB connector at the negative input terminal. When the logical values of these input signals do not match, the logic element 125 outputs a positive logic signal, and where they do match, it outputs a negative logic signal. The output logic signals are sent to the logic unit 111 via signal lines not shown in the drawing.

As the third flip-flop pair 151 and 152, the flip-flop 151 latches the signal D+ input from the signal line 131 at the rising edge of the clock CLK and supplies it to the input terminal of the buffer 121, while the flip-flop 152 latches the signal D− input from the signal line 132 at the rising edge of the clock CLK and supplies it to the input terminal of the buffer 122. Here, the clock line 135 is placed such that the difference in the delay periods of the clock CLK provided to the flip-flop pair 151 and 152 is effectively zero.

As the fourth flip-flop pair 153 and 154, the flip-flop 153 latches the signal D+ input from the buffer 123 at the rising edge of the clock CLK and supplies it to the signal line 133, while the flip-flop 154 latches the signal D− input from the buffer 124 at the rising edge of the clock CLK and supplies it to the signal line 134. Here, the clock line 135 is placed such that the difference in the delay periods of the clock CLK provided to the flip-flop pair 153 and 154 is effectively zero.

The operation of the USB circuit shown in FIG. 1 will now be described.

The operation when USB signals D+ and D− are output to an external device from the USB circuit will first be described.

First, the logic unit 111 generates and outputs USB signals D+ and D−. At the rising of the clock CLK, the signal D+ is latched to the flip-flop 141 and the signal D− is latched to the flip-flop 142. Here, because the flip-flops 141 and 142 use a common operating clock CLK, the signals D+ and D− are output simultaneously. Consequently, the phases of the USB signals D+ and D− can be said to completely match at this point.

The signal D+ output from the flip-flop 141, being transmitted in the signal line 131 and arrives at the flip-flop 151. Similarly, the signal D− output from the flip-flop 142, being transmitted in the signal line 132 and arrives at the flip-flop 152. Thereafter, at the rising of the operating clock CLK, the signal D+ is latched to the flip-flop 151 and the signal D− is latched to the flip-flop 152. Here, the because flip-flops 151 and 152 use a common operating clock CLK, the signals D+ and D− are latched simultaneously. Consequently, even if a phase difference between the signals D+ and D− occurs during propagation over the signal lines 131 and 132, this difference is eliminated by the flip-flops 151 and 152. As a result, the propagation delay amounts for the signal lines 131 and 132 need not be perfectly equal.

The USB signals D+ and D− output from the flip-flops 151 and 152 are sent to the respective input terminals of the buffers 121 and 122 simultaneously. The signals D+ and D− output from these buffers 121 and 122 are sent to a USB connector not shown in the drawing. As described above, the propagation delay times from the buffers 121 and 122 to the USB connector are identical. Therefore, the USB signals D+ and D− are output from the USB connector at the same time.

The operation when USB signals D+ and D− are input from the outside will now be described.

First, the USB signals D+ and D− are input to the USB connector, which is not shown in the drawing. The signal D+ is input to the flip-flop 153 via the buffer 123, and the signal D− is input to the flip-flop 154 via the buffer 124. Next, at the rising edge of the clock CLK, the signals D+ and D− are respectively latched to the flip-flops 153 and 154. As described above, the propagation delay times from the USB connector to the buffers 123 and 124 are identical, and the flip-flops 153 and 154 use a common clock CLK. As a result, the flip-flops 153 and 154 latch the signals D+ and D− at the same time.

The signal D+ latched to the flip-flop 153 is output to the signal line 133, while the signal D− latched to the flip-flop 154 is output to the signal line 134. At the next rising of the clock CLK, the signals D+ and D− are respectively latched to the flip-flops 143 and 144. In this way, the flip-flops 143 and 144 use a common operating clock CLK, so the signals D+ and D− are latched at the same time. As a result, even if a phase difference between the signals D+ and D− occurs during propagation over the signal lines 133 and 134, this difference is eliminated by the flip-flops 143 and 144. Therefor, the propagation delay amounts for the signal lines 133 and 134 need not be perfectly equal.

The USB signals D+ and D− output from the flip-flops 143 and 144 are then input to the logic unit 111.

As described above, in the USB circuit 100 according to this embodiment, the flip-flop pairs 141, 142 and 151, 152 enable phase difference between the USB signals D+, D− that are transmitted in the signal lines 131 and 132 to be eliminated. Furthermore, in the USB circuit 100, the flip-flop pairs 143, 144 and 153, 154 enable phase difference between the USB signals D+ and D− that is transmitted in the signal lines 133 and 134 to be eliminated. Consequently, because there is no need in this embodiment to ensure that the lengths of the signal line pairs 131, 132 and 133, 134 are exactly equal, the layout design burden is reduced, and there is only a slim likelihood of phase difference occurring between the signals D+ and D− due to a change in the external operating conditions, such as a fluctuation in the power supply voltage or the ambient temperature.

Moreover, because the lengths of the signal lines 131 and 132 need not be exactly equal, when designing only the circuit block according to the USB circuit 100 and employing it in designs of various types of integrated circuit chips (i.e., when the USB circuit 100 is used as an IP block), the design burden can be reduced. In other words, because the design condition with related to the signal lines 131–134 are flexible in this embodiment, the integrated circuit that uses this USB circuit 100 can be designed easily, and there is little influence on the design of other circuit blocks.

Where an integrated circuit is designed using a CAD (Computer Aided Design) apparatus, it is preferred that the entire USB driver 120 be designed as a single circuit block and registered. This is due to the fact that, while wiring conditions for the signal lines 131 to 134 are relaxed in this embodiment, the design and wiring conditions regarding the elements 121 to 125 and 151 to 154 in the USB driver 120 are stricter.

Second Embodiment

The USB circuit according to a second embodiment of the present invention will be described below with reference to FIG. 2.

Figure 2:
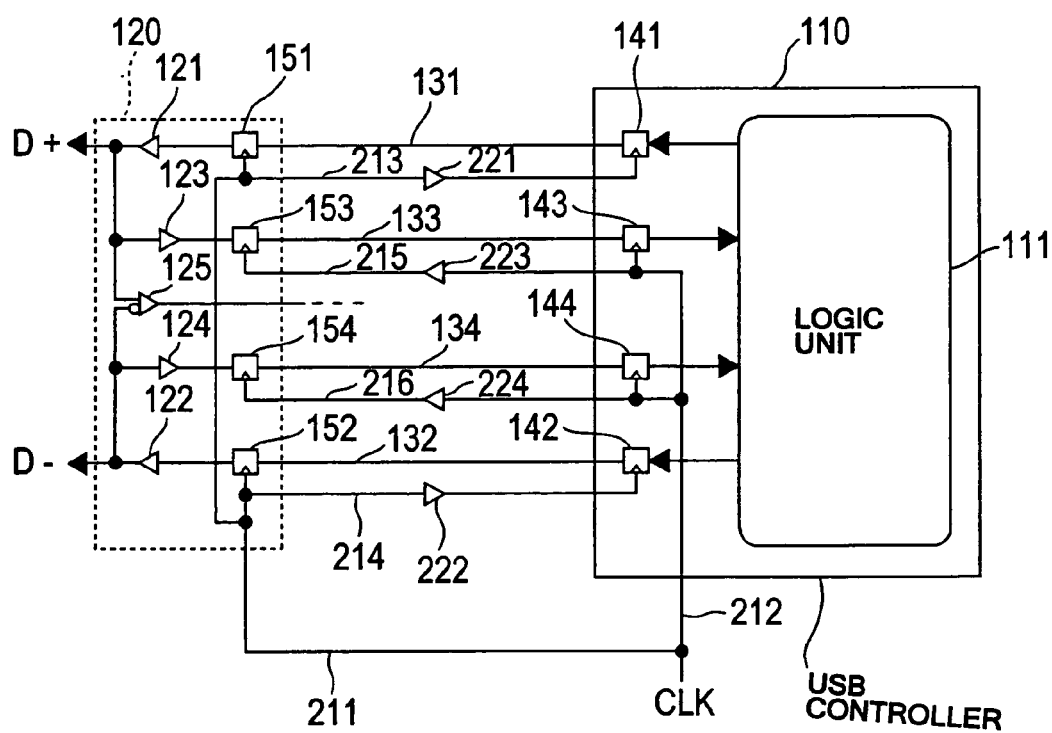
FIG. 2 is a circuit diagram showing in a simplified fashion the principal structure of a USB circuit according to a second embodiment.

FIG. 2 is a circuit diagram showing in a simplified fashion the principal structure of a USB circuit according to this embodiment. In FIG. 2, the constituent elements to which the same numbers as in FIG. 1 are assigned indicate the same constituent elements as those indicated in FIG. 1.

In the USB circuit 200 according to this embodiment, the circuit that supplies the clock CLK to the first through fourth pairs of flip-flops is different from that of the first embodiment.

The clock line 211 is a signal line that supplies a clock CLK generated by a clock generating circuit not shown in the drawing to the third flip-flop pair 151 and 152. The clock line 211 is placed such that the difference in the delay periods of the clock CLK provided to the flip-flop pair 151 and 152 is effectively zero.

The clock line 212 supplies the clock CLK generated by the clock generating circuit to the second flip-flop pair 143 and 144. The clock line 212 is placed such that the difference in the delay periods of the clock CLK provided to the flip-flop pair 143 and 144 is effectively zero.

A clock line 213 connects the clock input terminal of the flip-flop 151 and the clock input terminal of the flip-flop 141. A delay element 221 is provided on the clock line 213.

A clock line 214 connects the clock input terminal of the flip-flop 152 and the clock input terminal of the flip-flop 142. A delay element 222 is provided on the clock line 214.

A clock line 215 connects the clock input terminal of the flip-flop 143 and the clock input terminal of the flip-flop 153. A delay element 223 is provided on the clock line 215.

A clock line 216 connects the clock input terminal of the flip-flop 144 and the clock input terminal of the flip-flop 154. A delay element 224 is provided on the clock line 216.

Because the overall operation of the USB circuit 200 according to this embodiment is essentially identical to that of the USB circuit 100 according to the first embodiment, such operation will not be described here.

As shown in FIG. 2, in the USB circuit 200 of this embodiment, the clock CLK supplied to the third flip-flop pair 151 and 152 is supplied to the first flip-flop pair 141 and 142 after a prescribed delay period. Similarly, the clock CLK supplied to the second flip-flop pair 143 and 144 is supplied to the fourth flip-flop pair 153 and 154 after a prescribed delay period. In other words, in this embodiment, the latch timing for the flip-flop pair on the side that inputs the signals D+ and D− from the pair of signal lines is faster than the latch timing for the flip-flops on the output side.

Because the USB controller 110 and USB driver 120 are separated by a considerable distance on the integrated circuit chip, it can be difficult to match the phases of the clock CLK between the circuits 110 and 120. Furthermore, because external conditions such as the power supply voltage and ambient temperature can fluctuate during actual operation of the semiconductor integrated circuit, the phase difference of the clock CLK between the circuits 110 and 120 may increase. In these cases, the latch timings with regard to the various flip-flops become non-uniform. Where the latch timings for the flip-flop pair on the side that inputs the signals D+ and D− are slower than the latch timings for the output side flip-flop pair, a probability of erroneous operation of the USB circuit 200 become high. This is because the timing at which the signal D+ or D− is latched to the input side flip-flop is likely to be faster than the design timing by one clock signal.

However, in this embodiment, because the latch timings for the input side flip-flop pair do not become slower than the latch timings for the output side flip-flop pair, erroneous operation of the USB circuit 200 can be prevented.

In addition, using this embodiment, phase difference between the signals D+ and D− can be prevented and the design burden when employing an IP block is reduced for the same reason described in connection with the first embodiment.

Third Embodiment

The USB circuit according to a third embodiment of the present invention will be described below with reference to FIG. 3.

Figure 3:
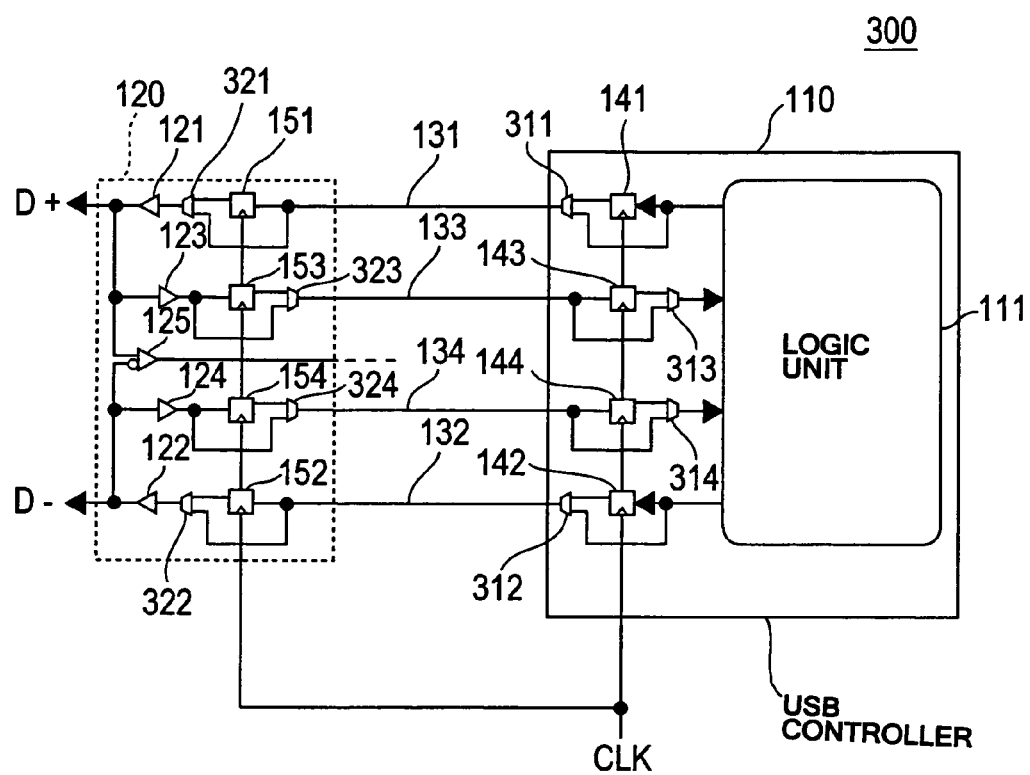
FIG. 3 is a circuit diagram showing in a simplified fashion the principal structure of a USB circuit according to a third embodiment.

FIG. 3 is a circuit diagram showing in a simplified fashion the principal structure of a USB circuit according to this embodiment. In FIG. 3, the constituent elements to which the same numbers as in FIG. 1 are assigned indicate the same constituent elements as those indicated in FIG. 1.

The USB circuit 300 according to this embodiment differs from the first embodiment in that it includes selectors 311 to 314 and 321 to 324.

One input terminal of the selector 311 inputs the signal D+ from the logic unit 111, while the other input terminal inputs the signal D+ from the flip-flop 141. The selector 311 selects either of the signals D+ and outputs it to the signal line 131.

One input terminal of the selector 312 inputs the signal D− from the logic unit 111, while the other input terminal inputs the signal D− from the flip-flop 142. The selector 312 selects either of the signals D− and outputs it to the signal line 132.

One input terminal of the selector 313 inputs the signal D+ from the signal line 133, while the other input terminal inputs the signal D+ from the flip-flop 143. The selector 313 selects either of the signals D+ and outputs it to the logic unit 111.

One input terminal of the selector 314 inputs the signal D− from the signal line 134, while the other input terminal inputs the signal D− from the flip-flop 144. The selector 314 selects either of the signals D− and outputs it to the logic unit 111.

One input terminal of the selector 321 inputs the signal D+ from the signal line 131, while the other input terminal inputs the signal D+ from the flip-flop 151. The selector 321 selects either of the signals D+ and outputs it to the buffer 121.

One input terminal of the selector 322 inputs the signal D− from the signal line 132, while the other input terminal inputs the signal D− from the flip-flop 152. The selector 322 selects either of the signals D− and outputs it to the buffer 122.

One input terminal of the selector 323 inputs the signal D+ from the buffer 123, while the other input terminal inputs the signal D+ from the flip-flop 153. The selector 323 selects either of the signals D+ and outputs it to the signal line 133.

One input terminal of the selector 324 inputs the signal D− from the buffer 124, while the other input terminal inputs the signal D− from the flip-flop 154. The selector 324 selects either of the signals D− and outputs it to the signal line 134.

The selectors 311–314 and 321–324 are controlled via selection signals not shown in the drawing. The input signal selected by each selector may be determined in accordance with the design conditions of the logic unit 111 or other components.

For example, where the signals D+ and D− are output from the logic unit 111 at the same time and the difference in the signal propagation delay times between the logic unit 111 and the flip-flops 141 and 142 does not present a problem, there is no need to use both the flip-flop pair 141 and 142 and the flip-flop pair 151 and 152. In this case, it is acceptable to have the selectors 311 and 312 select the output from the logic unit 111 and to have the selectors 321 and 322 select the output from the flip-flops 151 and 152. If this is done, the time required for the signals D+ and D− to reach the USB driver 120 can be shortened by one clock signal while phase difference between the signals D+ and D− is prevented.

Moreover, it can also be expected the case where phase difference between the signals D+ and D− can be sufficiently prevented by having the selectors 311 and 312 select the output from the flip-flops 141 and 142 and by having the selectors 321 and 322 select the output from the signal lines 131 and 132.

Similarly, when the signals D+ and D− are input from the outside, it would in some cases be unnecessary to use both the flip-flop pair 141 and 142 and the flip-flop pair 151 and 152.

Because the operation of the USB circuit 300 is otherwise identical to the operation of the USB circuit 100 according to the first embodiment, further description will be omitted.

As described above, using this embodiment, it can be selected whether the matching of signal timings using pairs of flip-flops is performed or not based on the design conditions for the integrated circuit as a whole. By not using the unnecessary flip-flop pair, the propagation delay time of the signals D+ and D− can be shortened.

In addition, using this embodiment, phase difference between the signals D+ and D− can be prevented and the design burden when employing an IP block is reduced for the same reason described in connection with the first embodiment.

Fourth Embodiment

The USB circuit pertaining to a fourth embodiment of the present invention will be described below with reference to FIG. 4.

Figure 4:
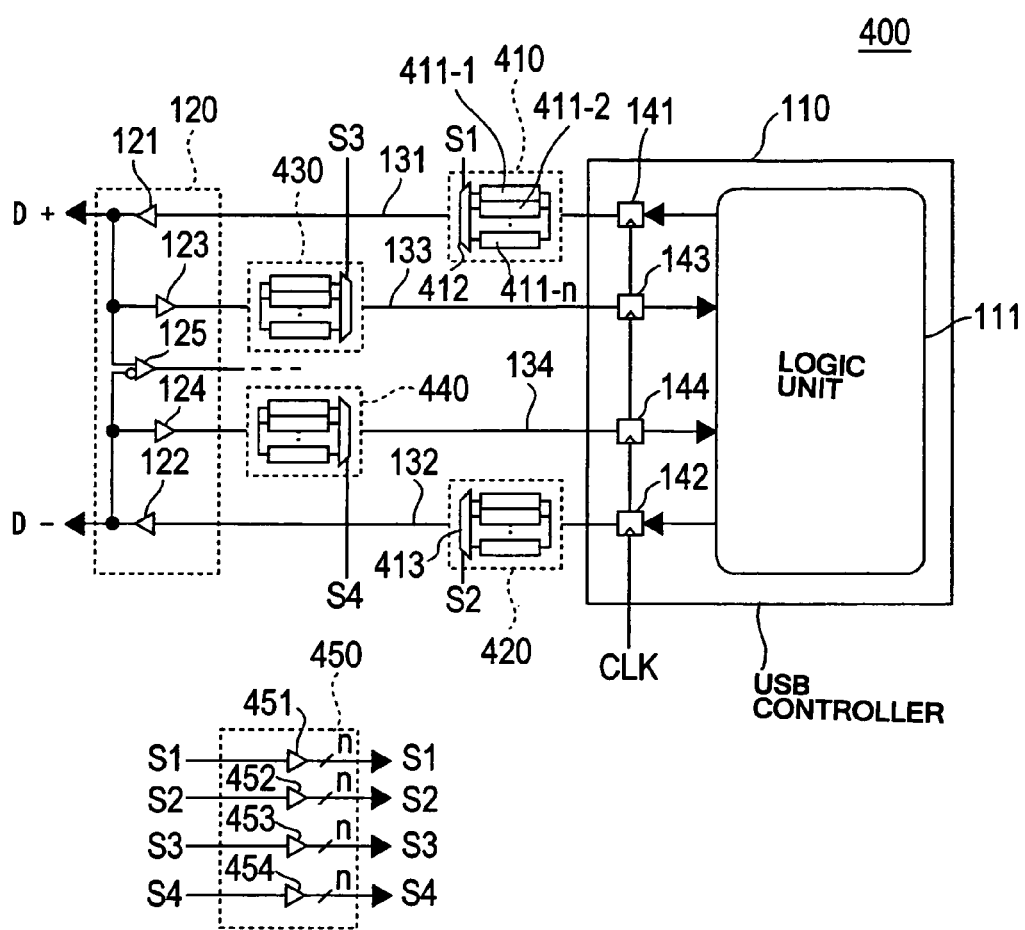
FIG. 4 is a circuit diagram showing in a simplified fashion the principal structure of a USB circuit according to a fourth embodiment.

FIG. 4 is a circuit diagram showing in a simplified fashion the principal structure of a USB circuit according to this embodiment. In FIG. 4, the constituent elements to which the same numbers as in FIG. 1 are assigned indicate the same constituent elements as those indicated in FIG. 1.

The USB circuit 400 according to this embodiment differs from the first embodiment in that it includes delay adjustment circuits in place of the flip-flops 151–154.

First delay adjustment circuits 410 and 420 adjust the signal propagation delay times for the output signal line pair 131 and 132. The set values for these signal propagation delay times are determined in accordance with delay control signals S1 and S2.

Second delay adjustment circuits 430 and 440 adjust the signal propagation delay times for the output signal line pair 133 and 134. The set values for these signal propagation delay times are determined in accordance with delay control signals S3 and S4.

A buffer circuit 450 inputs from the outside the delay control signals S1–S4 supplied to the delay adjustment circuits 410–440.

As shown in FIG. 4, the delay adjustment circuit 410 includes (n) number of delay elements 411-1 to 411-n and a selector 412.

The signal D+ output from the flop-flop 141 is input to one end of each delay element 411-1 to 411-n, which then outputs it from the other end after a prescribed delay period. Each delay element 411-1 through 411-n has a different delay period.

The selector 412 inputs the post-delay signals D+ output from the delay elements 411-1 through 411-n, selects one of the signals, and outputs it to the signal line 131. The signal to be selected by the selector 412 is determined by the delay control signal S1.

The delay adjustment circuits 420, 430 and 440 have the identical construction as the delay adjustment signal 410.

The buffer circuit 450 includes buffers 451–454. The buffers 451–454 input the delay control signals S1–S4 that are output from the outside and supply them to the delay adjustment circuits 410–440.

The set value for the delay period may be determined through empirical measurement of the signal propagation delay time difference between the output signal line pair 131 and 132, and of the signal propagation delay time difference between the input signal line pair 133 and 134, for example. In the case of the output signal lines 131 and 132, the signals D+ and D− output from a USB connector not shown in the drawing can be monitored and the signal values of the delay control signals S1 and S2 can be adjusted to eliminate any phase difference between the signals D+ and D−.

Because the operation of the USB circuit 400 is otherwise identical to that of the USB circuit 100 pertaining to the first embodiment, further description thereof will be omitted.

As described above in connection with the USB circuit 400 according to this embodiment, the use of the delay circuits 410–440 enables the signal propagation delay times for the output signal line pair 131, 132 and for the input signal line pair 133, 134 to be precisely matched. Consequently, because the lengths of these signal lines need not be equal, the circuit block is easy to design. Moreover, for the same reason described in connection with the first embodiment, the design burden when employing an IP block is reduced.

Moreover, the signal propagation delay time can be changed in response to changes in the external operating conditions (such as the power supply voltage and ambient temperature), which also allows the signal propagation delay times to be precisely matched.

In addition, while in the first to third embodiments the signal propagation delay time for each pair of signal lines is one clock signal period, in this embodiment there is no such limitation. Therefore, the signal propagation delay time does not more slow than need, so high-speed communication become possible.

Fifth Embodiment

The USB circuit pertaining to a fifth embodiment of the present invention will be described below with reference to FIG. 5.

Figure 5:
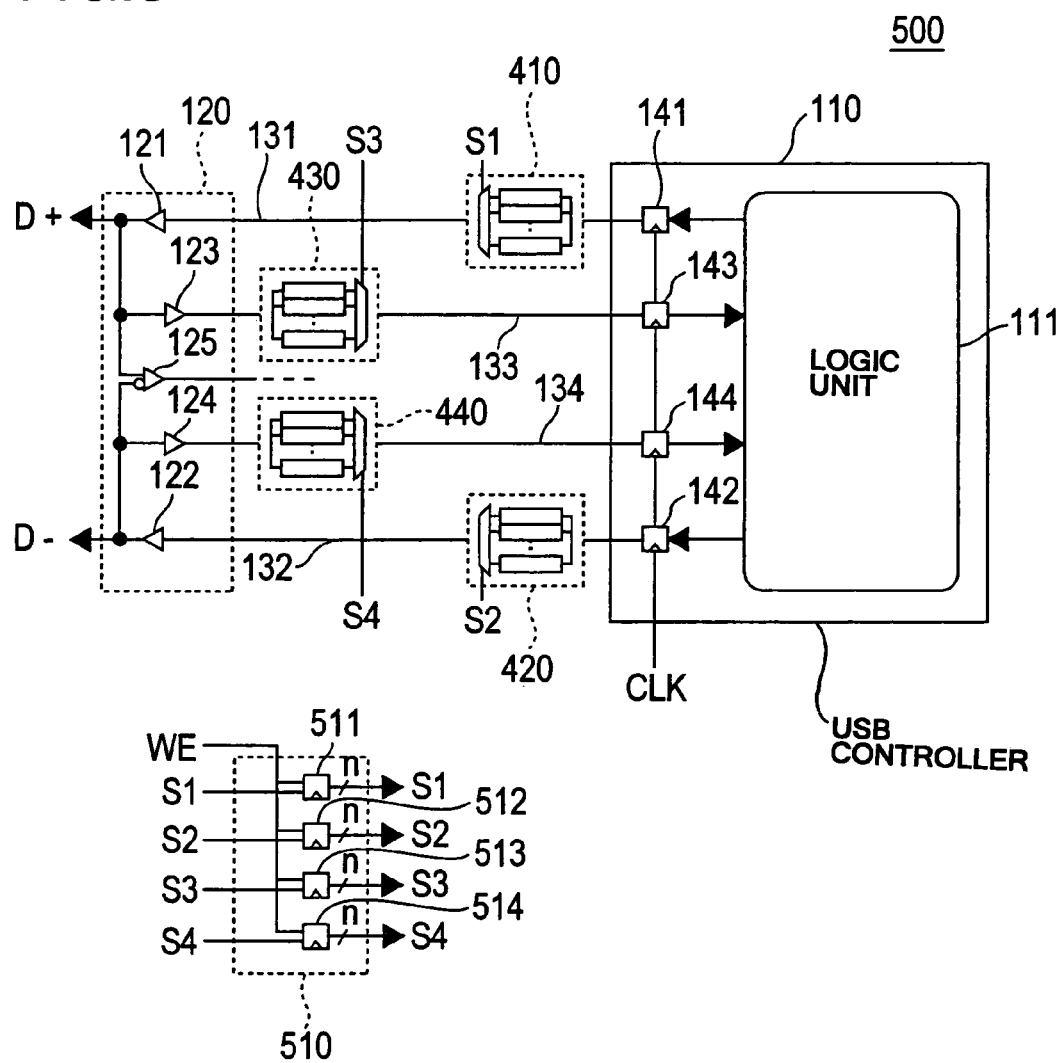
FIG. 5 is a circuit diagram showing in a simplified fashion the principal structure of a USB circuit according to a fifth embodiment.

FIG. 5 is a circuit diagram showing in a simplified fashion the principal structure of a USB circuit according to this embodiment. In FIG. 5, the constituent elements to which the same numbers as in FIG. 4 are assigned indicate the same constituent elements as those indicated in FIG. 4.

The USB circuit 500 according to this embodiment differs from the fourth embodiment in that it includes a trimming adjustment circuit 510 in place of the buffer circuit 450.

The trimming adjustment circuit 510 includes four flip-flops 511 to 514.

When the write-enable signal WE is at active level, the flip-flops 511 to 514 take in and hold, at the rising of the clock CLK, the respective delay control signals S1 through S4 input from the outside. The flip-flops 511 to 514 then supply the held delay control signals S1 to S4 to the delay adjustment circuits 410–440.

The write-enable signal WE is supplied to the trimming adjustment circuit 510 by a CPU (Central Processing Unit) not shown in the drawing, for example. The CPU sets the write-enable signal WE to active level to obey the various conditions present, and rewrites the delay control signals S1 to S4 stored in the trimming adjustment circuit 510.

Because the operation of the USB circuit 500 is otherwise identical to that of the USB circuit 100 according to the first embodiment, further description thereof will be omitted.

As described above, the USB circuit 500 pertaining to this embodiment achieves the same effect as the USB circuit 400 according to the fourth embodiment, while also enabling the delay control signals S1–S4 to be easily rewritten using software.

Sixth Embodiment

The USB circuit according to a sixth embodiment of the present invention will be described below with reference to FIG. 6.

Figure 6:
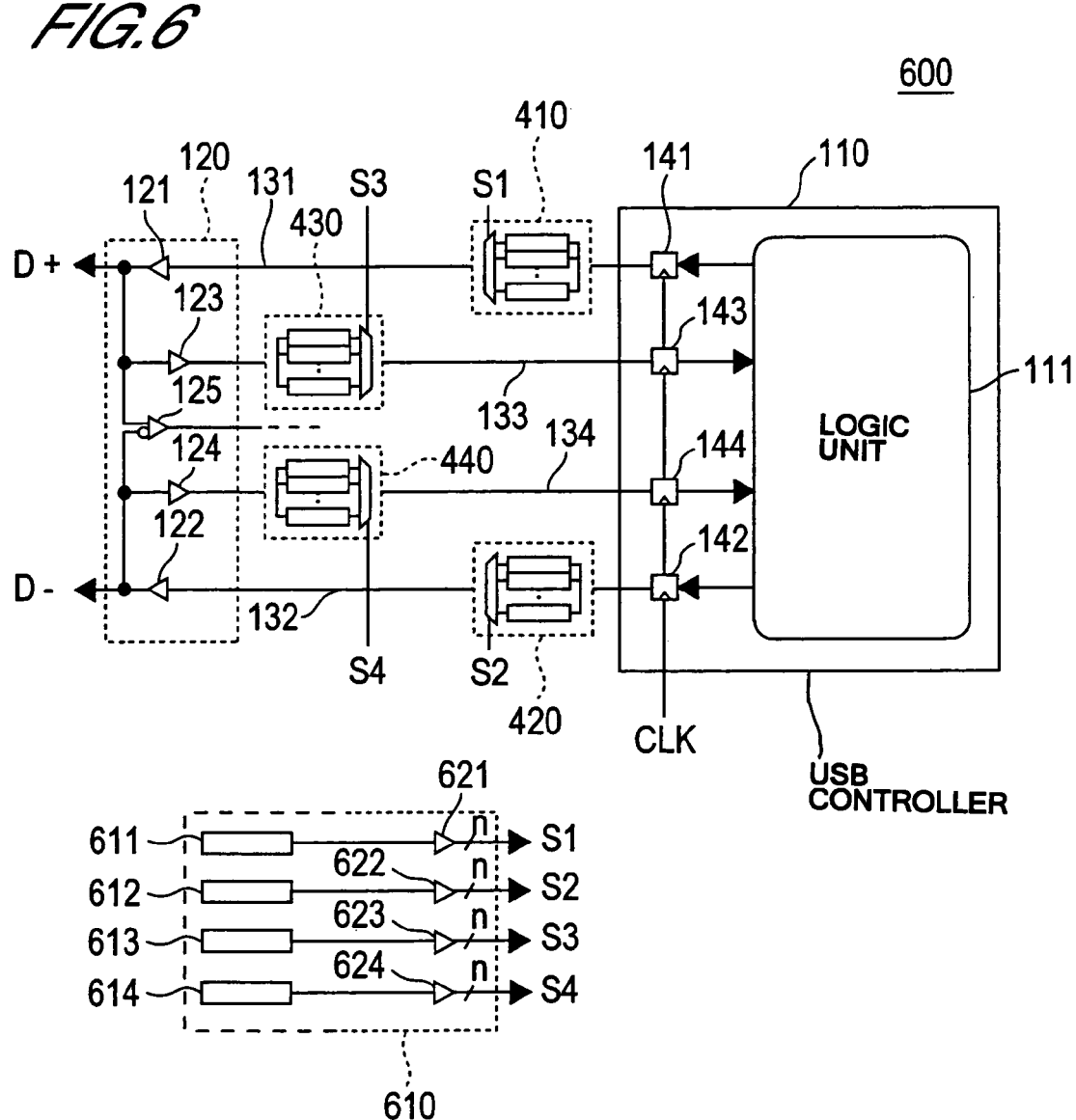
FIG. 6 is a circuit diagram showing in a simplified fashion the principal structure of a USB circuit according to a sixth embodiment.

FIG. 6 is a block diagram showing in a simplified fashion a circuit diagram showing in a simplified fashion the principal structure of a USB circuit according to this embodiment. In FIG. 6, the constituent elements to which the numbers as in FIG. 5 are assigned indicate the same constituent elements as those indicated in FIG. 5.

The USB circuit 600 according to this embodiment differs from the fifth embodiment in regard to the construction of the trimming adjustment circuit 610.

The trimming adjustment circuit 610 includes fuse circuits 611–614 and buffers 621–624.

The fuse circuits 611–614 output the delay control signals S1–S4. The fuse circuits 611–614 each include a plurality of fuses not shown in the drawing. The value of each delay control signal S1–S4 is set based on the state of connection or disconnection of these fuses. The fuses are connected or disconnected at the time when the semiconductor chip on which the USB circuit 600 is mounted is manufactured.

The buffers 621–624 input the delay control signals S1–S4 from the corresponding fuse circuit 611–614 and supply them to the corresponding delay adjustment circuit 410–440.

Because the operation of the USB circuit 600 is otherwise identical to that of the USB circuit 100 according to the first embodiment, further description thereof will be omitted.

As described above, the USB circuit 600 pertaining to this embodiment achieves the same effect as the USB circuit 400 according to the fourth embodiment, while also fixing the values of the delay control signals S1–S4, making it easy to perform control during actual operation.

Seventh Embodiment

The USB circuit according to a seventh embodiment of the present invention will be described below with reference to FIG. 7.

Figure 7:
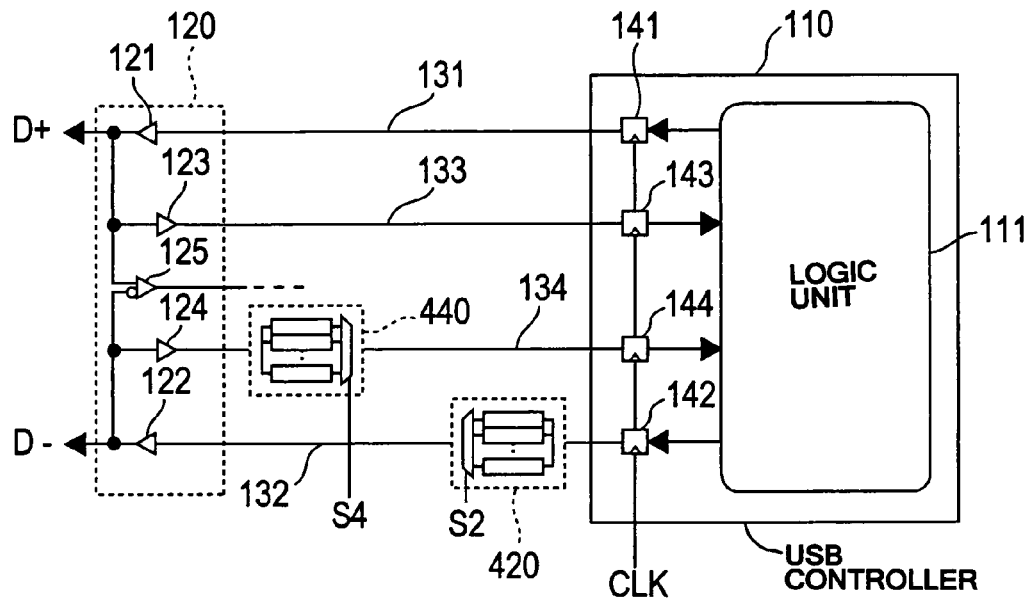
FIG. 7 is a circuit diagram showing in a simplified fashion the principal structure of a USB circuit according to a seventh embodiment.
Figure 7:
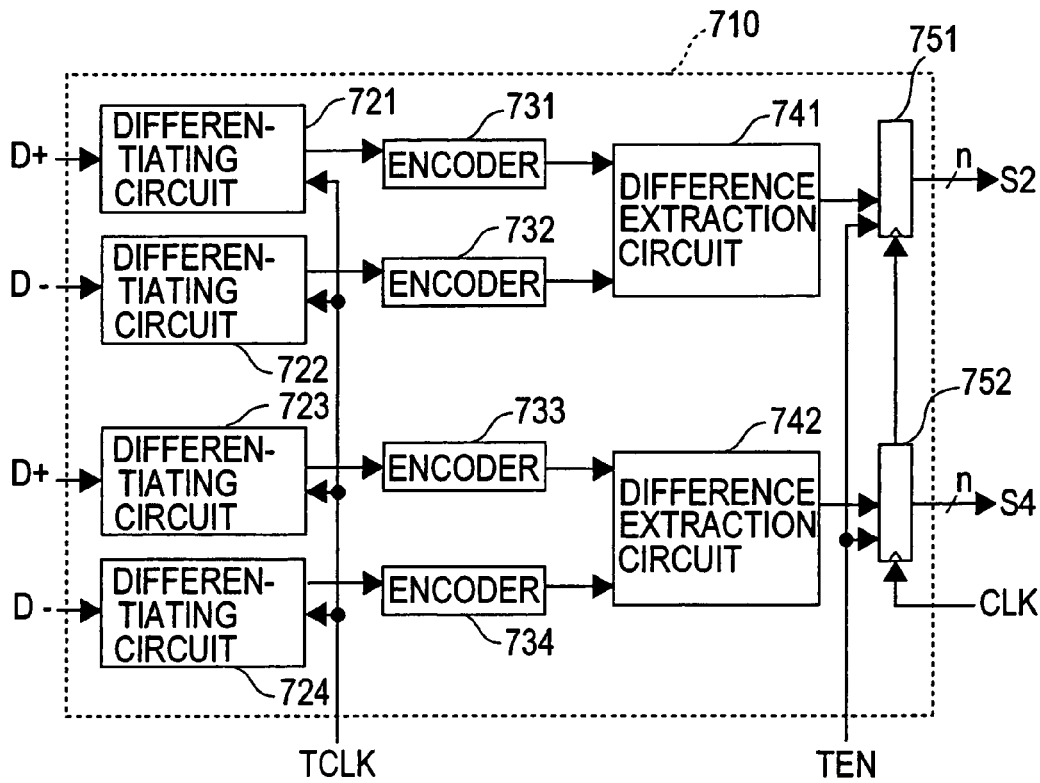

FIG. 7 is a circuit diagram showing in a simplified fashion the principal structure of a USB circuit according to this embodiment. In FIG. 7, the constituent elements to which the same numbers as in FIG. 5 are assigned indicate the same constituent elements as those indicated in FIG. 5.

In the USB circuit 700 according to this embodiment, only the signal lines 132 and 134 have delay adjustment circuits. Furthermore, the USB circuit 700 differs from the fifth embodiment in regard to the construction of the trimming adjustment circuit.

The trimming adjustment circuit 710 includes differentiating circuits 721–724, encoders 731–734, difference extraction circuits 741 and 742 and registers 751 and 752.

The differentiating circuits 721–724 input signals from the corresponding signal line 131–134, and then differentiate the input signals at times indicated by a trimming clock signal TCLK. This permits detection of the timing at which the signal value for each signal changes.

The encoders 731–734 input the differentiated signals output from the corresponding differentiating circuit 721–724 and encode them.

The difference extraction circuit 741 inputs from the encoder 731 the encoded signal corresponding to the signal line 131 and inputs from the encoder 732 the encoded signal that corresponds to the signal line 132. Moreover, the difference extraction circuit 741 detects the difference between the signal propagation delay times of the signal lines 131 and 132 through a comparison of these encoded signals. The result of this detection is sent to the register 751 as the delay control signal S2.

Similarly, the difference extraction circuit 742 inputs from the encoder 733 the encoded signal corresponding to the signal line 133 and inputs from the encoder 734 the encoded signal that corresponds to the signal line 134. Moreover, the difference extraction circuit 742 detects the difference between the signal propagation delay times of the signal lines 133 and 134 through a comparison of these encoded signals. The result of this detection is sent to the register 752 as the delay control signal S4.

When the trimming-enable signal TEN is at active level, the registers 751 and 752 take in and hold the delay control signals S2 and S4 at the rising of the clock CLK. The held delay control signals S2 and S4 are then sent to the delay adjustment circuits 420 and 440.

Because the operation of the USB circuit 700 is otherwise identical to that of the USB circuit 100 according to the first embodiment, further description thereof will be omitted.

As described above, the USB circuit 700 according to this embodiment achieves the same effect as the USB circuit 400 according to the fourth embodiment, while also allowing the delay times for the delay adjustment circuits 420 and 440 to be automatically set, making it easy to perform control by the CPU.

Eighth Embodiment

The USB circuit according to an eighth embodiment of the present invention will be described below with reference to FIG. 8.

Figure 8:
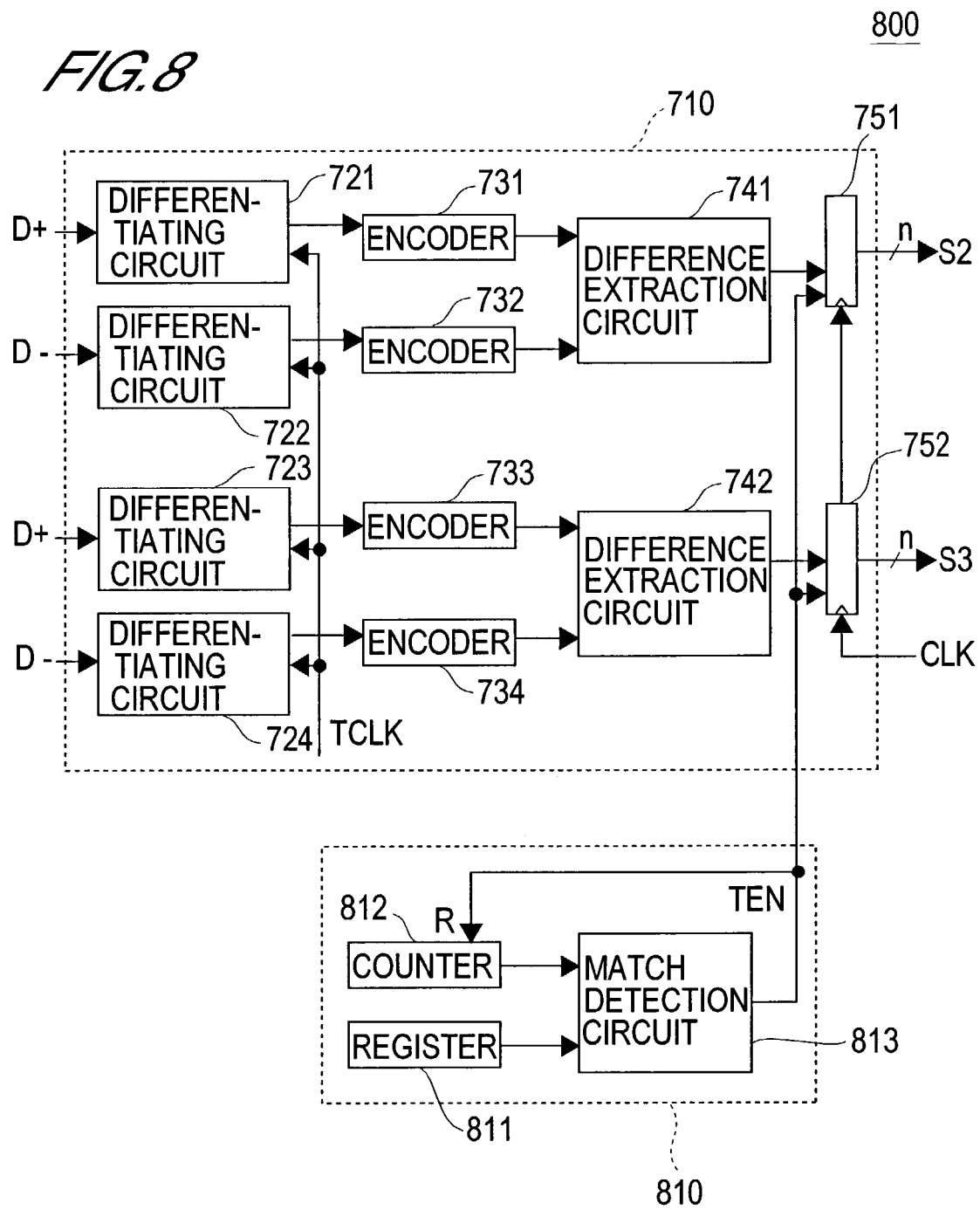
FIG. 8 is a circuit diagram showing in a simplified fashion the essential constituent elements of a USB circuit pertaining to a eighth embodiment.

FIG. 8 is a circuit diagram showing in a simplified fashion the principal structure of a USB circuit according to this embodiment. In FIG. 8, the constituent elements to which the same numbers as in FIG. 7 are assigned indicate the same constituent elements as those indicated in FIG. 7. In addition, because the constructions of the components 110, 120, 131–134, 420, 440 and the like are identical to the components in the seventh embodiment, they are omitted from FIG. 8.

The USB circuit 800 according to this embodiment differs from the seventh embodiment described above in that it includes a trimming trigger generating circuit 810.

The trimming trigger generating circuit 810 generates and outputs a trimming-enable signal TEN, and comprises a register 811, a counter 812, and a match detection circuit 813.

The register 811 stores a value corresponding to the cycle at which trimming is executed under controlling of a CPU not shown in the drawing.

The counter 812 counts a prescribed clock (such as the clock CLK). The counter 812 also inputs the enable signal TEN from the match detection circuit 813 and resets the count value when the enable signal TEN is set to active level.

The match detection circuit 813 compares the value stored in the register 811 with the count value in the counter 812, and sets the enable signal TEN to active level when the two values match.

Regarding the trimming trigger generating circuit 810 having the above construction, when the count value in the counter 812 does not match the value stored in the register 812, the enable signal TEN is set to non-active level, while when the count value in the counter 812 does match the value stored in the register 811, the enable signal TEN is set to active level. Because the counter 812 is reset when the enable signal TEN is set to active level, the count value become not to match the value stored in the register 811, and as a result the enable signal TEN returns to non-active level. The counter 812 then recommences counting from zero.

Accordingly, when a trimming trigger generating circuit 810 is used in this way, the enable signal TEN can be automatically set to active according to a cycle determined by a value stored in the register 811. Therefore, there is no need for the CPU not shown in the drawing to generate a trimming-enable signal TEN.

As described above, the USB circuit 800 according to this embodiment achieves the same effect as the USB circuit 400 according to the fourth embodiment, while also allowing CPU control to be executed more easily than in the seventh embodiment.

Ninth Embodiment

The USB circuit according to an ninth embodiment of the present invention will be explained below with reference to FIG. 9.

Figure 9:
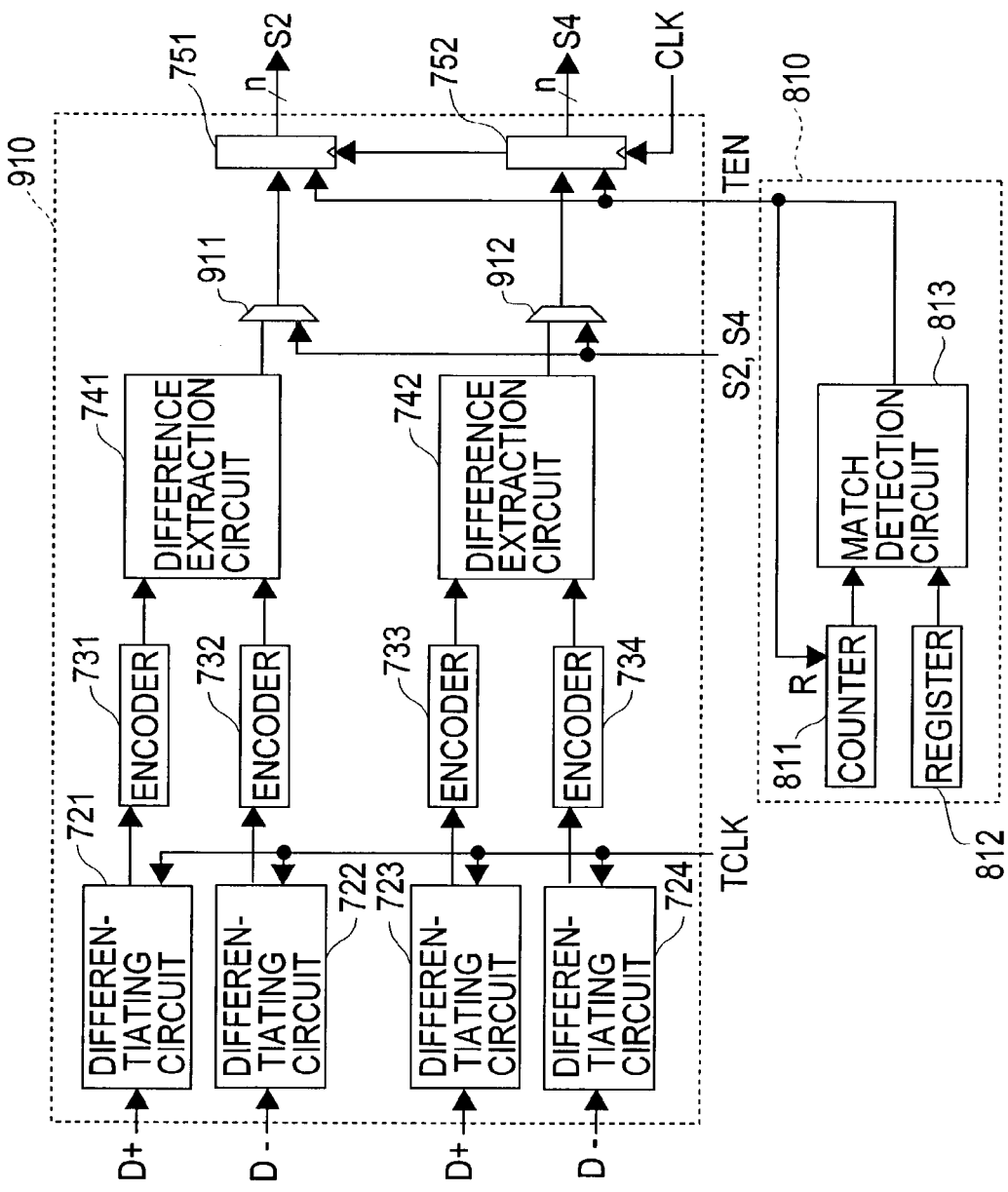
FIG. 9 is a circuit diagram showing in a simplified fashion the principal structure of a USB circuit according to a ninth embodiment.

FIG. 9 is a circuit diagram showing in a simplified fashion the principal structure of a USB circuit according to this embodiment. In FIG. 9, the constituent elements to which the same numbers as in FIG. 8 are assigned indicate the same constituent elements as those indicated in FIG. 8. In addition, because the constructions of the components 110, 120, 131–134, 420, 440 and the like are identical to the components in the eighth embodiment, they are omitted from FIG. 9.

This embodiment differs from the eighth embodiment described above in that the trimming adjustment circuit 910 comprises selectors 911 and 912.

One input terminal of the selector 911 inputs the delay control signal S2 from the difference extraction circuit 741, while the other input terminal inputs the delay control signal S2 from the CPU or the like not shown in the drawing. The selector 911 selects one of these delay control signals S2 and sends it to the register 751. The signal to be selected by the selector 911 is determined by the CPU or the like not shown in the drawing.

Similarly, one terminal of the selector 912 inputs the delay control signal S4 from the difference extraction circuit 742, while the other input terminal inputs the delay control signal S4 from the CPU or the like not shown in the drawing. The selector 912 selects one of these delay control signals S4 and sends it to the register 752. The signal to be selected by the selector 912 is determined by the CPU or the like not shown in the drawing.

Regarding this embodiment, when sufficient precision is not obtained via the automatic trimming executed by the differentiating circuits 721–724, the encoders 731–734 and the difference extraction circuits 741 and 742, the delay control signals S2 and S4 can be set by the CPU or the like by force.

In other words, the USB circuit 900 according to this embodiment achieves the same effect as the eighth embodiment, while also allowing trimming to be carried out more reliably than the USB circuit 800 of the eighth embodiment.

As described in detail above, according to the present invention, a USB circuit that prevents phase difference between signal pairs with high precision without requiring strict design condition can be provided.

What is claimed is:

1. A universal serial bus circuit comprising:
   a universal serial bus controller formed on a semiconductor chip;
   a universal serial bus driver formed on said semiconductor chip;
   a first signal line pair and a second signal line pair formed on said semiconductor chip for connecting said universal serial bus controller and said universal serial bus driver;
   a first flip-flop pair provided in said universal serial bus controller which makes a timing of a first signal pair output to said first signal line pair, by latching the first signal pair at substantially the same time;
   a second flip-flop pair provided in the universal serial bus controller which makes a timing of a second signal pair input from said second signal line pair, by latching the second signal pair at substantially the same time;
   a third flip-flop pair provided in the universal serial bus driver which matches the timing of said first signal pair input from said first signal line pair, by latching the first signal pair at substantially the same time; and
   a fourth flip-flop pair provided in the universal serial bus driver which matches the timing of said second signal pair output to said second signal line pair, by latching the second signal pair at substantially the same time.

2. The universal serial bus circuit according to claim 1, wherein an operating clock is supplied to said second and third flip-flop pairs and the operating clock is supplied to said first and fourth flip-flop pairs after a prescribed period of delay.

3. The universal serial bus circuit according to claim 1, further comprising:
   a first selector pair for selecting execution or non-execution of timing matching by said first flip-flop pair,
   a second selector pair for selecting execution or non-execution of timing matching by said second flip-flop pair,
   a third selector pair for selecting execution or non-execution of timing matching by said third flip-flop pair,
   a fourth selector pair for selecting execution or non-execution of timing matching by said fourth flip-flop pair.

* * * * *

UNITED STATES PATENT AND TRADEMARK OFFICE
CERTIFICATE OF CORRECTION

PATENT NO. : 7,020,851 B2 Page 1 of 1
DATED : March 28, 2006
INVENTOR(S) : Eiji Komoto It is certified that error appears in the above-identified patent and that said Letters Patent is hereby corrected as shown below:

<u>Column 14,</u>
Lines 12 and 16, change "makes" to -- matches. --.

Signed and Sealed this

Twenty-third Day of May, 2006

JON W. DUDAS
*Director of the United States Patent and Trademark Office*